April 19, 1955 — J. H. McLEOD ET AL — 2,706,666
SPINDLE MOUNTING
Filed Nov. 5, 1953
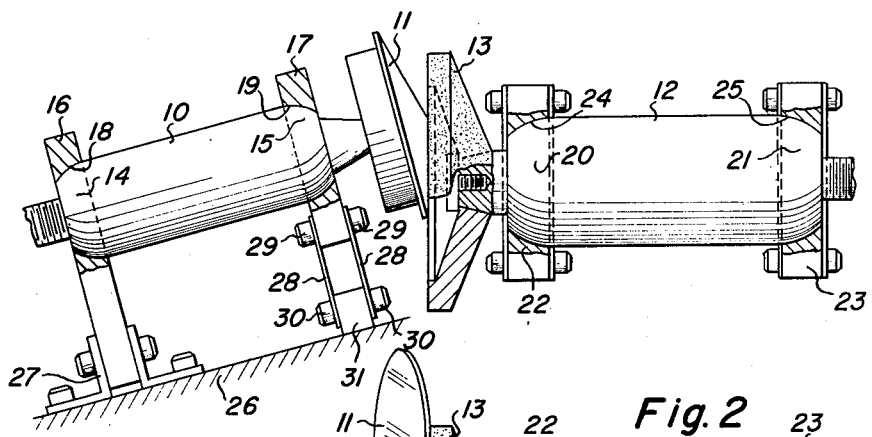
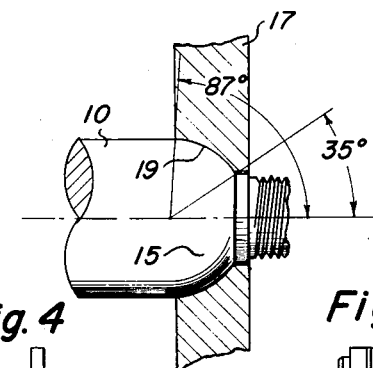
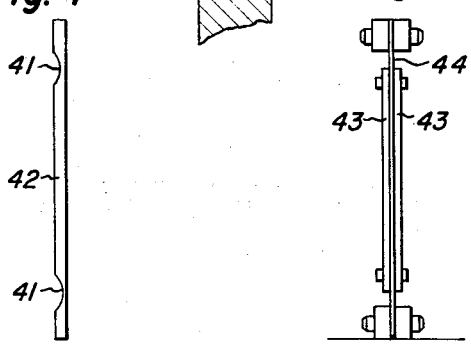
JOHN H. MCLEOD
CHARLES W. CLUTZ
INVENTORS
BY
ATTORNEYS

United States Patent Office 2,706,666
Patented Apr. 19, 1955

2,706,666

SPINDLE MOUNTING

John H. McLeod and Charles W. Clutz, Rochester, N. Y., assignors to Eastman Kodak Company, Rochester, N. Y., a corporation of New Jersey Application November 5, 1953, Serial No. 390,274

4 Claims. (Cl. 308—72)

The present invention relates to supporting means for rotatable spindles, and particularly to an improved spindle mounting which is useful in precision work for the reason that it eliminates all endwise and lateral play in the spindle while providing a self-aligning spindle support which automatically adjusts itself for any wear in the spindle bearings.

In the grinding of precision optical elements, and in accurate lathe work, the problem of supporting the work and tool spindles so that there is no end or lateral play is a very important one. This problem is complicated by the fact that bearings, no matter how well they are lubricated, are subject to a certain amount of wear and such wear sets up a lateral and end play problem which may also affect the alignment of the spindle. While many expensive and rather complicated constructions have been introduced to overcome this problem in precision spindle mountings, it has been found that these problems have not been adequately solved.

The primary object of the present invention is to provide an improved precision spindle mounting which solves both the problems of alignment and lateral and end play.

Another object is to provide a spindle mounting which solves these problems even though the construction of the mounting is simple and inexpensive.

A further object is to provide a spindle mounting which includes spherical bearing surfaces between the spindle and bearings therefor so that there is no problem of alignment of bearings.

Another, and a most important, object is to provide a spindle mounting using pairs of flat or reed springs for holding one or both bearings against the spindle. These supports eliminate all end and lateral play in the spindle.

Another object is to provide a spindle mounting of the type described wherein the spindle bearings are annular in shape with the spindle extending therethrough, and wherein the bearing surfaces are only portions of spheres with the extreme ends thereof preferably lying within the limits of 35° and 87° from the spindle axis.

The novel features that we consider characteristic of our invention are set forth with particularity in the appended claims. The invention itself, however, both as to its organization and its methods of operation, together with additional objects and advantages thereof, will best be understood from the following description of specific embodiments when read in connection with the accompanying drawing in which:

Fig. 1 is a top plan view, partly in section, of a machine for grinding or generating a precise conical surface on an optical element, and wherein the tool and work spindles are shown mounted in accordance with two different embodiments of the present invention;

Fig. 2 is a side elevational view of the grinding wheel and its spindle mounting;

Fig. 3 is an enlarged detailed view of one end of one of the spindles and its bearing, and illustrating the practical limits as to extent of the spherical portions of the bearing surfaces relative to the spindle axis; and Figs. 4 and 5 are enlarged elevational views of two different embodiments of reed springs which might be used to support the bearings.

Generally speaking, a spindle mounting according to the present invention involves providing the spindle with spherical portions spaced axially of the spindle. These two spherical portions of the spindle are embraced and engaged by bearing surfaces which are portions of spheres, said bearings being spring urged toward each other by a pair of reed springs supporting at least one of the bearings. These reed springs are very stiff for motion perpendicular to the axis of the spindle but allow motion to take up play along the spindle. Being spherical, the bearings are insensitive to misalignment.

For illustrating the present invention we have shown our improved spindle mountings in connection with an apparatus for generating conical surfaces on optical elements because this is a classic example of a device which requires a precision spindle mounting. It is pointed out, however, that the spindle mounting might be useful in connection with any form of apparatus where a precise mounting of a rotatable spindle is necessary, i. e., precision lathes, boring machines, etc.

Referring now to the drawings, a machine for generating precise conical surfaces comprises one rotatable spindle 10 to the end of which is chucked the cone 11 being generated. Another rotatable spindle 12 carries a grinding wheel 13 on one end, said grinding wheel being charged with diamond dust and dipping into a pan of water 14. For polishing, a wheel coated with wax is substituted for the grinder and it dips into a mixture of rouge and water. As shown in Fig. 1, the spindles are set at an angle to each other so as to obtain the required cone angle on the piece of work. It will be understood that means, not shown, will be provided for accurately adjusting the angular relation of these two spindles in accordance with the angle desired on the piece of work. Likewise, any suitable means, not shown, may be provided on each of the spindles for rotating the same, for example, a driving pulley may be attached to the end of each of the spindles extending through the bearing most remote from the work position or a driving pulley might be placed on the spindle between the two bearings. However, since such means for annularly adjusting the relation of the two spindles and for rotating the same forms no part of the present invention, these details have been omitted.

Coming now to the present invention, or to the mountings for the two spindles 10 and 12, while each could have the same type of mounting, we have shown the two having slightly different mountings in order to illustrate two different embodiments of the present invention. These two spindle mountings are alike in that they comprise providing the spindles with two axially spaced spherical portions which are engaged by bearings which embrace the spindle and have bearing surfaces which are portions of spheres and which engage the spherical portions on the spindle. Looking at the work spindle 10, it will be seen that this spindle has two axially spaced spherical portions 14 and 15 which are engaged by annular bearings 16 and 17, respectively, having bearing surfaces 18 and 19, respectively, which are portions of spheres. Looking at tool spindle 12, it will be seen that it also has two axially spaced spherical portions 20 and 21 which are engaged by annular bearings 22 and 23, respectively, having bearing surfaces 24 and 25, respectively, which are portions of spheres.

Coming now to the difference in the two spindle mountings, bearing 16 for the work spindle 10 is rigidly connected to a supporting member 26 by a rigid block 27, which may be an extension of the bearing proper. The bearing 17, on the other hand, is supported on the surface 26 by a pair of parallel reed springs 28 connected at one end to the bearing 17 by bolts 29 and at the other end by bolts 30 to a lug 31 extending upwardly from the supporting surface. These reed springs should possess the characteristic of being very stiff or rigid as regards deflection in their own plane but should be capable of deflection in a direction transversely of their own plane or in the direction along the spindle axis. Thin plates of resilient metal serve in this capacity very well and their thickness will depend upon their lateral dimensions and the edgewise stress to which they might be subjected in the machine of which they form a part. In this particular application we have found that metal plates having a width of about four inches, a length of about five inches and a thickness of between $\frac{1}{16}$ and $\frac{1}{32}$ inch serve very well as so-called reed springs. Prior to, or during, assembly these reed springs are put under stress so as to normally urge the bearing 17 toward fixed bearing 16.

Looking now at the supports for the bearings 22 and 23 of the tool spindle 12, it will be noticed that here both bearings are supported by a pair of parallel reed springs, rather than only one as in the former case where one bearing (16) was fixed. In this instance, the bearing 22 is supported by parallel reed springs 35 bolted at one end 36 to the bearing and at the other end 37 to a support member 38 which is slidably mounted on a track support 39. Likewise, bearing 23 is supported by parallel reed springs 40 fixed at opposite ends to the bearing and support member 38. As before, these reed springs take the form of resilient metal plates which are rigid against deflection in their own plane but are susceptible to limited deflection in a transverse direction or along the axis of the spindle. Prior to, or during, assembly the pairs of reed springs 35 and 40 are put under stress in opposite directions so that they tend to urge the bearings 22 and 23 toward one another. The support member 38 is adjustable along track support 39 by adjustable means, not shown, so that the grinder may be fed into the work.

The combined action of the reed springs and the spherical bearings gives a spindle that has no end play, most important in connection with the work spindle, and no side play other than that in the oil film. It is important that the bearings be only portions of spheres. It will be noted that the spindles extend through the bearings. We have found that a practical extent of the spherical surface of the bearings is from 35° to 45° from the spindle axis to about 80° to 87°, see Fig. 3. If the bearing surface was a complete hemisphere, the ball or sphere on the end of the spindle might rest on the bearing axis. This would give no end play but would permit side or lateral play unless the ball were a perfect fit in the bearing.

In Figs. 4 and 5 we have shown two different forms of reed spring constructions which will give maximum rigidity for motions perpendicular to the axis of the spindle but will allow motion to take up play along the spindle axis. In Fig. 4 the reed spring comprises a relatively thick metal plate 40 which would normally not permit deflection in a direction transverse of its own plane. To provide for this desired transverse deflection, however, one or both faces of the plate adjacent each end is provided with milled out grooves 41 which reduce the thickness of the plates at these points sufficiently to provide the desired transverse deflection. At least two of these grooves 41 must be provided as shown so that the reed can deflect at these two points in opposite directions when a force is applied along the spindle axis. This will be clear when it is noted that should a metal plate, which is thin enough to deflect, be used as a reed spring, the deflection of the reed will be in the form of an S, the top and bottom portions bending in opposite directions when a force is applied along the spindle axis. This is a desirable characteristic for the reason that even though these reed supports deflect, they will maintain the spindle axis parallel to its original position, notwithstanding the fact that, in exaggerated cases of deflection, the axis might drop down below its original position. In this respect such reed spring supports act in the same way as would a parallelogram linkage between the two parts.

Now looking at Fig. 5 the reed springs may comprise a relatively thin metal plate or spring 44 which by itself would not give the necessary edgewise rigidity but would have a desirable flexibility in a transverse direction. The desired edgewise rigidity can be given to this spring 44 by clamping it between a pair of rigid metal plates 43 which are shorter than the spring 44. Now if the spring plate 44 is clamped to the bearing and support, as indicated, then the short portions thereof not embraced by the rigid plates 43 will allow for the desired transverse deflection, while the combination will have the desired edgewise rigidity.

Although we have shown and described certain specific embodiments of our invention, we are fully aware that many modifications thereof are possible. Our invention, therefore, is not to be limited to the precise details of construction shown and described but is intended to cover all modifications coming within the scope of the appended claims.

What we claim as our invention and desire to secure by Letters Patent of the United States is:

1. A spindle mounting comprising in combination a stationary support, a rotatable spindle having two axially spaced spherical portions, an annular spherical bearing embracing each of said spherical portions, means for mounting said bearings so that they are rigid against movement in a direction perpendicular to the spindle axis but are capable of limited movement along said spindle axis and are biased toward one another, said means comprising four reed springs capable of flexing in a transverse direction but rigid in their own plane, one pair of said reed springs connected in parallel spaced relation between each bearing and said support and each pair biased axially of said spindle to urge the bearings toward one another.

2. A spindle mounting comprising in combination a stationary support, a rotatable spindle having two axially spaced spherical portions, an annular spherical bearing embracing each of said spherical portions, means for rigidly mounting one of said bearings to said support, and means for mounting the other bearing on said support so that it is rigidly held against movement in a direction perpendicular to the spindle axis while being capable of limited movement longitudinally of said axis and biased toward said fixed bearing, said last-mentioned means comprising a pair of flexible plates connected in parallel spaced relation between said bearing and said support and biased axially of said spindle toward said fixed bearing with their planes extending perpendicular to said spindle axis, and a pair of rigid plates slightly shorter than said flexible plates clamped together in face to face relation with each of said flexible plates so as to leave a portion of each end of said flexible plate exposed whereby said flexible plates are rigid against deflection in a plane perpendicular to said spindle axis while being capable of limited deflection in a transverse direction by virtue of said unrestricted portions at the opposite ends thereof.

3. A spindle mounting comprising in combination a stationary support, a rotatable spindle having two axially spaced spherical portions, an annular spherical bearing embracing each of said spherical portions, means for rigidly mounting one of said bearings to said support, and means for mounting the other bearing on said support so that it is rigidly held against movement in a direction perpendicular to the spindle axis while being capable of limited movement longitudinally of said axis and biased toward said fixed bearing, said last-mentioned means comprising a pair of metal plates, which are thick enough to be rigid against deflection in all directions, connected in parallel spaced relation between said bearing and said support and biased axially of said spindle to said fixed bearing, one face of each of said metal plates provided with a groove extending transversely thereof adjacent each end, said grooves having a depth such that the plates are capable of a limited flexure at these points in a direction along the spindle axis but are rigid against deflection in a direction perpendicular to said spindle axis.

4. A spindle mounting comprising in combination a stationary support, a rotatable spindle having two axially spaced spherical portions, an annular spherical bearing embracing each of said spherical portions, means for rigidly mounting one of said bearings to said support, and means for mounting the other bearing on said support so that it is rigidly held against movement in a direction perpendicular to the axis of said spindle while being capable of limited movement longitudinally of said axis and biased toward said fixed bearing and comprising a pair of reed springs capable of flexing in a transverse direction but rigid in their own plane, said reed springs connected in parallel spaced relation between said bearing and said support and biased axially of said spindle toward the fixed bearing.

References Cited in the file of this patent

UNITED STATES PATENTS 2,389,687     Rickenmann _____ Nov. 27, 1945

FOREIGN PATENTS 602,725     Germany _____ Sept. 14, 1934